(12) United States Patent
Hobbs et al.

(10) Patent No.: US 12,061,489 B2
(45) Date of Patent: Aug. 13, 2024

(54) CONTROL SYSTEM FOR ONE OR MORE ABLUTIONARY DEVICES

(71) Applicant: Kohler Mira Limited, Gloucesterhire (GB)

(72) Inventors: Barry Steven Hobbs, Cheltenham (GB); Alexander Colin Fagg, Cheltenham (GB); Mark Frederick Florencio Barton, Cheltenham (GB); Charles Maxwell Parker, Cheltenham (GB)

(73) Assignee: KOHLER MIRA LIMITED, Cheltenham (GB)

( * ) Notice: Subject to any disclaimer, the term of this patent is extended or adjusted under 35 U.S.C. 154(b) by 342 days.

(21) Appl. No.: 17/502,772

(22) Filed: Oct. 15, 2021

(65) Prior Publication Data
US 2022/0121232 A1    Apr. 21, 2022

(30) Foreign Application Priority Data
Oct. 19, 2020    (GB) ..................................... 2016538

(51) Int. Cl.
*G05D 23/19*    (2006.01)

(52) U.S. Cl.
CPC ..... *G05D 23/1917* (2013.01); *G05D 23/1931* (2013.01)

(58) Field of Classification Search
CPC ........... G05D 23/1917; G05D 23/1931; G05D 23/1393; E03C 1/0408; E03C 1/055; E03C 1/021; E03C 1/04; G05B 19/0423; G05B 2219/25257; F16K 11/22; F16K 31/04
See application file for complete search history.

(56) References Cited

U.S. PATENT DOCUMENTS

| | | | |
|---|---|---|---|
| 6,029,094 A | 2/2000 | Diffut | |
| 2013/0340863 A1* | 12/2013 | Peel | ..................... E03C 1/0409 137/560 |

FOREIGN PATENT DOCUMENTS

| CN | 205980349 U | * | 2/2017 |
|---|---|---|---|
| GB | 2 172 413 | | 9/1986 |
| JP | 2004-283455 | | 10/2004 |
| WO | WO-2013/190381 | | 12/2013 |

* cited by examiner

*Primary Examiner* — Emmanuel E Duke
(74) *Attorney, Agent, or Firm* — Husch Blackwell LLP

(57) ABSTRACT

A control system for one or more ablutionary devices includes a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and a controller in communication with the mixer valve. The controller is configured to obtain a supply coupling setting that indicates which of the first and second inlets is to receive, or is receiving, hot water during operation of the control system and which of the first and second inlets is to receive, or is receiving, cold water during operation of the control system; and control the mixer valve according to one or more target output water properties and the supply coupling setting.

17 Claims, 5 Drawing Sheets

CONTROL SYSTEM FOR ONE OR MORE ABLUTIONARY DEVICES

CROSS-REFERENCE TO RELATED PATENT APPLICATIONS

The present application claims priority to and the benefit of United Kingdom Application No. GB 2016538.7, filed Oct. 19, 2020, the entire disclosure of which, including the specification, drawings, claims and abstract, is incorporated herein by reference.

BACKGROUND

The present application relates to a control system for one or more ablutionary devices such as a shower system, a tap, faucet or the like or any combination of such ablutionary devices. The present application also relates to a method performed by such a control system. More specifically, the present application relates to the control of an electronically controlled ablutionary device such as a digital shower or tap.

Electronically controlled, or digital, showers and taps can include a mixer valve unit that is provided with a cold water and a hot water input from which a blended output stream is produced in response to an electrical control signal. A temperature sensor can be used in the output stream to create a feedback loop in order to control the temperature of the output stream by blending appropriate levels of the input hot and cold water. The feedback loop is used to maintain the output stream at a target temperature.

In a digital shower or tap system the temperature and flow of the output stream can be controlled remotely by the user with a separate user interface. This is usually located remotely from the mixer valve unit so that the mixer valve unit and user interface form a control system. The user interface allows the user to set a desired water output property, such as the desired temperature and/or flow rate, and can provide more complex control functionality such as allowing pre-programmed or custom shower experiences to be provided.

Digital shower/tap systems have a number of advantages in terms of improved functionality and user experience by giving greater and more convenient control of the output water stream. They are however more complicated to install and setup compared to traditional non-digital systems. To order to provide the correct temperature control the hot and cold water supplies must be coupled to the correct corresponding inlets of the mixer valve unit. This can make the mixer valve unit inconvenient and time consuming to install, and can cause incorrect operation that is difficult to diagnose if done incorrectly.

A general problem to be addressed therefore is how to provide an ablutionary device control system that is quick and easy to install correctly.

SUMMARY

An exemplary embodiment relates to a control system for one or more ablutionary devices, which includes a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and a controller in communication with the mixer valve. The controller is configured to obtain a supply coupling setting that indicates which of the first and second inlets is to receive, or is receiving, hot water during operation of the control system and which of the first and second inlets is to receive, or is receiving, cold water during operation of the control system; and control the mixer valve according to one or more target output water properties and the supply coupling setting.

Another exemplary embodiment relates to a method performed by a control system for one or more ablutionary devices. The control system includes a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve. The method includes obtaining a supply coupling setting that indicates which of the first and second inlets is to receive, or is receiving, hot water during operation of the control system and which of the first and second inlets is to receive, or is receiving, cold water during operation of the control system; and controlling the mixer valve according to one or more target output water properties and the supply coupling setting.

BRIEF DESCRIPTION OF THE DRAWINGS

Embodiments of the invention will now be described, by way of example only, with reference to the accompanying drawings, in which.

DETAILED DESCRIPTION

Figure 1:
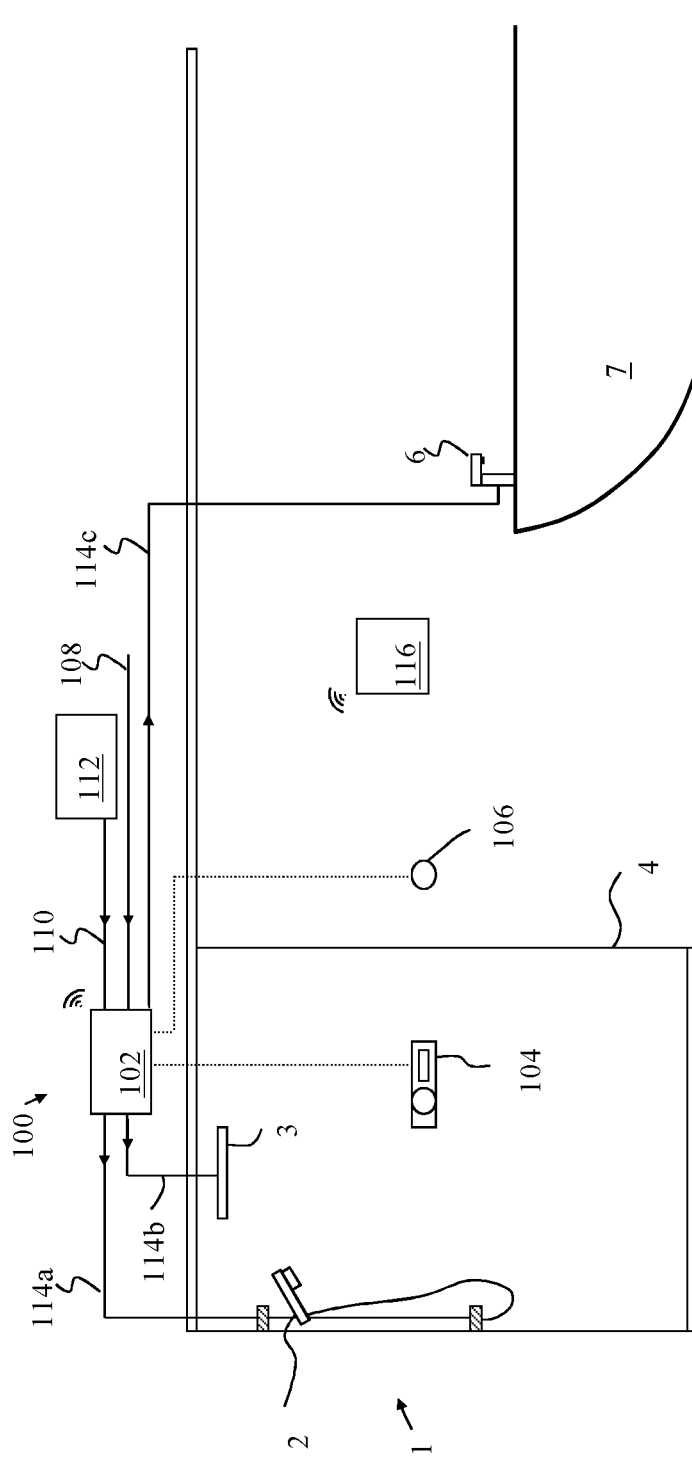
FIG. 1 shows a schematic side view of an ablutionary device having a control system according to an embodiment.

A first aspect provides a control system for one or more ablutionary devices, comprising any one or more of: a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve; and a controller in communication with the mixer valve, the controller configured to: obtain a supply coupling setting that indicates which of the first and second inlets is to receive, or is receiving, hot water during operation of the control system and which of the first and second inlets is to receive, or is receiving, cold water during operation of the control system; and control the mixer valve according to one or more target output water properties and the supply coupling setting.

The control system allows the user the flexibility to connect the hot water supply to either of the first or second inlets with the choice indicated to the controller using the supply coupling setting. This improves flexibility during installation as the install may choose which inlet to use for each water supply depending on which is easier to connect in the space provided. This may reduce the amount of pipe work needed. It also means that the control unit would not been to be reconnected if the water supplies were corrected incorrectly. The supply coupling setting can instead be changed rather than re-connecting pipework.

The control system may further comprise a first temperature sensor configured to generate a first temperature signal indicative of the temperature of water being received by the first inlet. The control system may further comprise a second temperature sensor configured to generate a second temperature signal indicative of the temperature of water being received by the second inlet. The controller may be configured obtain the supply coupling setting based on the first and/or second temperature signals.

The controller may be configured to compare the temperature signals provided by the first and/or second temperature sensors to at least one threshold to determine if they are detecting a hot water supply or a cold water supply.

The controller may be configured to obtain the supply coupling setting by receiving a user input defining which of the first and second inlets is coupled to a hot or cold water supply.

The controller may be configured to receive the supply coupling setting from a remote user device (e.g. a smartphone or tablet computer). The remote device may be configured to run a software application via which the user may select/set the supply coupling setting.

The controller may be in communication with a user interface (e.g. that may form part for the control system). The user interface may be configured to receive an input/ allow the user to select of the supply coupling setting.

The controller may be configured to receive the supply coupling setting via a wireless connection (e.g. via a Bluetooth or WiFi network).

The control system may further comprise a switch. The switch may be in communication with the controller, and configured to receive an input of the supply coupling setting.

A second aspect provides a method performed by a control system for one or more ablutionary devices, the control system comprising: a mixer valve having a first inlet and a second inlet configured to receive a supply of hot and cold water, and an outlet configured to output cold water, hot water or a mixture thereof as an output stream for suppling water to the one or more ablutionary devices downstream of the mixer valve, the method comprising: obtaining a supply coupling setting that indicates which of the first and second inlets is to receive, or is receiving, hot water during operation of the control system and which of the first and second inlets is to receive, or is receiving, cold water during operation of the control system; and controlling the mixer valve according to one or more target output water properties and the supply coupling setting.

The method may further comprise: generating a first temperature signal indicative of the temperature of water being received by the first inlet; and/or generating a second temperature sensor configured to generate a second temperature signal indicative of the temperature of water being received by the second inlet. The supply coupling setting may be obtained based on the first and/or second temperature signals.

The method may further comprise comparing the temperature signals provided by the first and/or second temperature sensors to at least one threshold to determine if they are detecting a hot water supply or a cold water supply.

The method may comprise obtaining the supply coupling setting by receiving a user input defining which of the first and second inlets is coupled to a hot or cold water supply.

The method may comprise receiving the supply coupling setting via a user interface or remotely connected user device (e.g. a smartphone or tablet device).

The input may be received via a wireless network connection.

The method may comprise receiving an input of the supply coupling setting via a switch provided as part of the control system.

The skilled person will appreciate that except where mutually exclusive, a feature described in relation to any one of the above aspects may be applied to any other aspect.

FIG. 1 illustrates a first ablutionary device 1 that is in the form of a shower system. The shower system comprises two water outlets: a first water outlet that is a wall mounted shower head 2 and a second water outlet that is an overhead shower head 3. The water outlets are mounted within a shower enclosure 4. FIG. 1 also shows a second ablutionary device in the form of a spout 6 that provides water to a bath tub 7.

Although three water outlets are shown in FIG. 1 (the spout, overhead shower head and wall mounted shower head), other numbers may be provided. For example, the shower system 1 may have only a single water outlet (e.g. a single shower head or spout) or may have three or more water outlets (e.g. additional mid-level shower heads). The present application relates to other types of ablutionary device which may, for example, be a tap (e.g. faucet) provided for a sink, wash basin, or other similar purpose. In yet other embodiments, each ablutionary device may be a mixture of both taps and shower heads. In some embodiments, the bath tub and shower may be combined (e.g. so that the shower is an over-bath shower).

FIG. 1 further shows a control system 100 that provides a controlled supply of water to the various water outlets of the shower system and bath tub. The control system may therefore be termed a control and supply system. In the embodiment shown in FIG. 1, the control system 100 provides a controlled water supply to two separate ablutionary devices. In other embodiments, any other number of ablutionary devices may be supplied and controlled, e.g. only one or three or more. For example, the control system may be connected to only a shower system or only a spout.

The supply of water is blended from a hot and cold water supply to give the desired water temperature. The control system 100 generally comprises a mixer valve unit 102, a user interface 104, and a remote on/off control 106. The mixer valve unit 102 receives a supply of cold water via a cold water conduit 108 coupled to the plumbing system of the building in which the shower system 1 is located. The cold water conduit provides a suitable supply of cold water. In some embodiments, the cold water supply is provided from a mains cold water supply or may instead be provided from a water tank such as a header tank (not shown in the figures). The mixer valve unit 102 also receives a supply of hot water via a hot water conduit 110 coupled to the plumbing system. The hot water conduit provides a supply of water that has been heated by a water heater 112 provided as part of the plumbing system. The water heater 112 may be an instantaneous water heater (such as a combi-boiler) or a storage water heater. Any other suitable water heater may be used. The mixer valve unit 102 supplies three output conduits 114a, 114b, 114c with a blended water stream produced by mixing the cold and hot water supplies as will be described in more detail later. The output conduits 114a, 114b, 114c are fluidly coupled to the water outlets 2, 3, 6 of the ablutionary devices 1, 6. The mixer valve unit 102 may have any suitable number of water outlets so that a variety of different forms of ablutionary device (having various numbers of water outlets as described above) can be supplied. In some embodiments, the mixer valve unit may have more water outputs than necessary for the ablutionary device or devices being supplied. Any such redundant outlets may be capped-off if not required.

The user interface 104 is mounted within the shower enclosure 4, and is arranged to display information to the user and receive user input to control the shower system. The remote on/off control 106 is located outside of the shower enclosure to allow the user to turn the shower on and off before entering the enclosure 4. In other embodiments, a separate remote on/off control 106 may not be provided, and the shower turned on and off from the user interface 104. A separate user interface may be provided on the bath spout 6 (not visible in the Figures) to allow the flow of water from the spout to be controlled.

The control system 100 may further include, or may be adapted to communicate with, a portable user device 116 that may be used to remotely control the shower system. The portable user device 116 may be a dedicated device, or may take the form of a smart phone or the like on which a suitable application can be installed to interface with the control system 100. The portable user device 116 is in wireless communication with the mixer valve unit 102 via any suitable wireless connection such as Bluetooth or via a WiFi network. In the embodiment shown in FIG. 1, the parts of the control system 100 remote from the mixer valve unit 102 have a wired connection to it. In other embodiments, a wired or wireless connection can be used between any separate parts of the control system 100. For example, the user interface 104 and remote on/off control 106 may be wirelessly connected.

The mixer valve unit 102 may be located within a loft or floor space generally above the shower system. In other embodiments, the mixer valve unit 102 may be located in any other suitable location, such as underneath the bath or in a cupboard.

Figure 2:
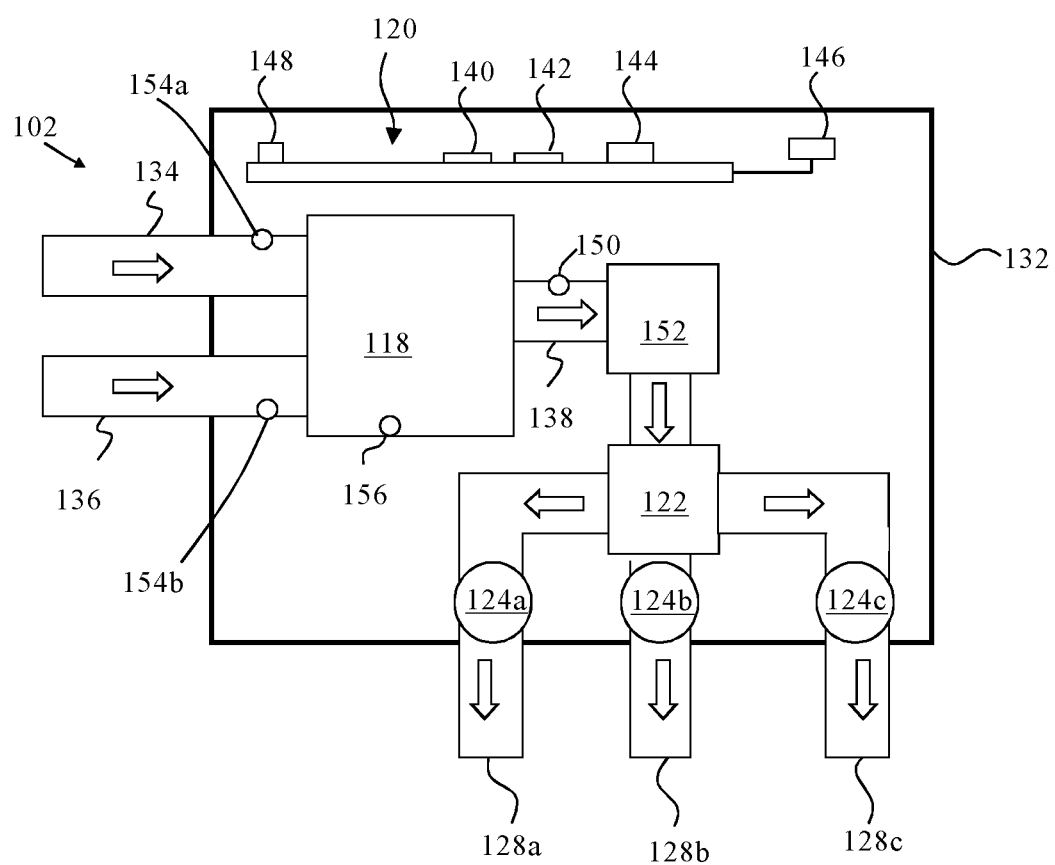
FIG. 2 shows a close-up schematic view of a mixer valve unit forming part of the control system shown in FIG. 1.

Referring now to FIG. 2, the mixer valve unit 102 is shown in more detail. The mixer valve unit 102 generally comprises: a mixer valve 118; a controller 120; a pump 122; first, second and third flow shut-off valves 124a, 124b, 124c; and first, second and third water outlets 128a, 128b, 128c. These components are mounted within a housing 132. Water flow through the mixer valve unit 102 is illustrated by the arrows in FIG. 2. The water carrying conduits, and the path taken by them, shown in FIG. 2 is a schematic example only to illustrate the general flow of water through the mixer valve unit 102. The water carrying conduits may have any suitable size and shape as required to allow for adequate water flow and mounting within the housing 132.

In the presently described embodiment, the mixer valve comprises first and second water inlets 134, 136, each of which is arranged to receive a supply of hot or cold water. Either one the inlets 134, 136 may be coupled to a hot or cold water supply, with the other inlet being coupled to the other of the hot and cold water supplies. In the presently described embodiment, the first water inlet 134 is coupled to the hot water conduit 110 and is referred to as the hot water inlet. The second water inlet 136 is coupled to the cold water conduit 108 and is referred to as the cold water inlet.

The mixer valve further comprises an outlet 138 that is configured to output cold water, hot water or a mixture thereof as an output stream for suppling water to the ablutionary devices 1,6 downstream of the mixer valve 118. The mixer valve 118 comprises one or more valves members that are movable to vary the rate of water flow between the hot and cold inlets and the outlet to control the blended stream. An example of a mixer valve 118 suitable for use in the mixer valve unit 102 will be described in more detail later.

The blended stream produced by the mixer valve 118 flows through the mixer valve outlet 138 (via a flow rate sensor as will be described later) to the pump 122. The pump 122 is also arranged to separate the blended stream into separate output flows. Each of these separate flows is used to supply each of the water outlets provided by the ablutionary device(s) (e.g. the wall mounted and overhead shower heads 2, 3 and bath spout 6). Although three separate output flows are produced by the pump in FIG. 2, any suitable number of outputs may be provided by splitting the blended stream into a suitable number of separate flows. If only one output from the mixer valve unit 102 is required the pump has a single input and output.

The separate output flows from the pump 122 flow through the first, second and third shut-off valves 124a, 124b, 124c respectively. The shut-off valves are each moveable between a closed and open state to provide independent control of water flowing to each water outlet of the ablutionary device(s). This may allow the user to choose which water outlets they wish to use, and independently control the flow rate through each one in a range between the maximum flow provided by the mixer valve 118 and zero flow. The shut-off valves may be solenoid valves. Other types of shut-off valves may however be used. Each output of the mixer valve unit may be provided with a respective shut-off valve. In yet other embodiments, the shut-off valves may not be provided.

The shut-off valves 124a, 124b, 124c are fluidly coupled to respective first, second and third water outlets 128a, 128b, 128c. The first and second outlets 128a, 128b are fluidly coupled to the output conduits 114a, 114b to supply the water outlets of the shower system as shown in FIG. 1, and the third outlet 128c is fluidly coupled to the third output conduit 114c to supply the spout 6.

The pump 122 is arranged to increase the pressure of output flow from the mixer valve 118. The pump 122 may be provided where the control system 100 is to be supplied with a low pressure hot and/cold water supply (e.g. water from a cold/hot water storage tank, rather than a mains supply). The pump 122 is located downstream of a flow rate sensor (as discussed below) and before the shut off valves 124a, 124b, 124c. In other embodiments, a pump may be provided at any suitable point within the control and supply system to increase pressure if required. In yet other embodiments, the pump is absent. Such an embodiment is suitable for use where the supply pressure is adequate without it (e.g. where mains water pressure is provided, rather than water from a hot or cold water storage tank). Where the pump is not provided it may be replaced by a pipework manifold connecting the single output stream from the mixing valve to each of the outlets 128a, 128b, 128c via the shut-off valves.

The controller 120 is arranged to control operation of the various components of the control system 100. The controller 120 is in operative communication with the mixer valve 118, shut-off valves 124a, 124b, 124c, user interface 104, remote on/off control 106 and portable user device 116 by suitable wired or wireless connections. The controller 120 comprises one or more processors 140 and a memory 142 arranged to store computer readable instructions that may be carried out by the processor 140 in order to perform any of functions of the controller described herein. The controller further comprises a wireless communication module in the form of a Bluetooth module 144 and a WiFi module 146 arranged to allow wireless communication between the controller 120 and remotely located parts of the control system. The wireless communication module is further arranged to provide communication over the internet via a wireless local area network (Wi-Fi network), cellular network or any other suitable wireless network. The WiFi module may be a separate module connected to a main PCBA of the controller 120 by a wired connection as shown in FIG. 2. The WiFi module is mounted within the housing 132 in the described embodiment, but may be located remotely from the housing 132 in other embodiments. In yet other embodiments, the WiFi module 146 is located on the main PCBA of the controller.

The controller 120 further comprises a wired connection point 148 to which wired connections to other components of the mixer valve unit or control system 100 may be made. In the presently described embodiment only a single wired connection point 148 is shown. There may however be any suitable number (e.g. three) so that there are one or more wired connection points.

In the embodiment illustrated in FIG. 2, the processor 140 and memory 142 form a microcontroller (MCU) configured to carry out any of the functions of the controller described herein. In other embodiments, the controller may take different forms. The controller may comprise any combination of hardware and software that operates to control and process information and carry out programmed instructions. The controller may comprise any suitable processing circuitry including microprocessors, programmable logic devices, application specific integrated circuits (ASIC), application specific instruction set processors (ASIP) or the like. The controller 120 may be any device suitable for controlling the operations of the control system according to the functions defined herein (or additional functions) by processing information (e.g. information received from sensors, stored in local memory or received from an external source) and outputting instructions to components of the control system (e.g. the mixer valve and shut-off valves accordingly). In some embodiments, the controller 120 may be formed from distributed components, some or all of which may be located outside of the mixer valve unit 102. For example, the controller 120 may be located remotely from the housing 132, and may have a suitable wired or wireless connection with the components within the housing. In the described embodiment a single controller is provided to control a single mixer valve unit 102 in which a single mixer valve is included to provide blended water to water outlets of any number of ablutionary devices. In other embodiments, the controller may be arranged to control multiple mixer valve units 102, for example each having a separate mixer valve 118 and receiving separate hot and cold water supplies. For example, the controller 120 shown in FIG. 2 may control another mixer valve unit that is similar to that shown in FIG. 2, but without needing a second controller.

The control system further comprises one or more sensors that are arranged provide measurements of various operating parameters to the controller 120. Although not shown in FIG. 2, the sensors are operably coupled, either wired or wirelessly, to the controller 120 to send signals thereto.

The control system comprises output stream sensors arranged to generate output stream signals indicative of various water properties of the blended output stream of the mixer valve 118. In the embodiment illustrated in FIG. 2, the output stream sensors include an output temperature sensor 150 and output flow rate sensor 152. In other embodiments an output pressure sensor (not shown in the figures) may also be provided. These sensors are positioned to measure the properties of the water flow at any position downstream of the mixer valve 118 (e.g. downstream of the point where the blended stream is produced within the mixer valve, which may include within the mixer valve itself e.g. downstream of the valve member(s) controlling flow through the valve). They may be located within the mixer valve unit 102 as shown in FIG. 2. They may, for example, be between the mixer valve 118 and the pump 122 or manifold pipe work at which the output stream is divided. They may however be at any suitable position within the mixer valve unit. In other embodiments, they may be provided further downstream from the mixer valve unit.

The control system further comprises a first temperature sensor 154a arranged to generate a temperature signal indicative of the temperature of water flowing through or being supplied to the first water inlet 134 of the mixer valve. The first temperature sensor 154a may be located adjacent to the respective water inlet aperture of the mixer valve, or may be located further downstream at any point before the water flows are mixed within the mixer valve (it may therefore be within the mixer valve itself). The first temperature sensor may be located within the mixer valve unit 102 as shown in FIG. 2. The first temperature sensor may alternatively be located further upstream, and may be upstream of the mixer valve unit 102.

The control system further comprises a second temperature sensor 154b arranged to generate a temperature signal indicative of the temperature of water flowing through or being supplied to the second water inlet 136 of the mixer valve 118. The second temperature sensor 154b may be located adjacent to the respective water inlet aperture of the mixer valve, or may be located further downstream at any point before the water flows are mixed within the mixer valve (it may therefore be within the mixer valve itself). The second temperature sensor 145b may be located within the mixer valve unit 102 as shown in FIG. 2. The second temperature sensor may alternatively be located further upstream, and may be upstream of the mixer valve unit 102.

In the described embodiment, both a first and second temperature sensor are provided to measure temperature signals indicative of the temperature of the hot water supply or the cold water supply to the mixer valve 118. The first or second temperature sensors may measure either a hot water supply temperature signal or cold water supply temperatures signal, depending on which of the first and second inlet 134, 136 is being used to carry hot and cold water. In the described embodiment, the first temperature sensor 154a is a hot inlet temperature sensor measuring a hot temperature signal, and the second temperature sensor 154b is a cold inlet temperature sensor measuring a cold temperature signal. The user may select which inlet is which via a suitable user input once the system is connected, or the controller may be arranged to detect this automatically as will be described in more detail later.

In the described embodiment, the mixer valve comprises a valve position sensor 156 arranged to measure an actual valve position signal indicative of the actual position of the valve member or members within the mixer valve 118. The position of the valve members may be measured relative to the valve seat with which they are associated to provide feedback as to how much hot or cold water is being allowed to flow through the mixer valve 118. The valve position sensor 156 may be an encoder (e.g. a rotatory encoder) which may be any suitable type of inductive, magnetic, Hall Effect or resistive sensor. In other embodiments, a target position of the valve members may be relied on rather than a measured actual valve member position. In such an embodiment the valve position sensor 156 is not required and so is absent.

Any of the temperature sensors described herein may comprise a thermistor. Other types of temperature sensor may however be used such as a thermocouple, semiconductor sensor, infrared sensor or any other suitable sensor.

Any of the flow rate sensors described herein may comprise a flow turbine, ultrasonic sensor, pressure differential sensor or any other suitable type of flow rate sensor.

The position of the sensors shown in FIG. 2 is for illustration purposes only. The sensors may be located at any suitable position in order to provide the measurement of the desired properties of water flowing through the control system, or of the control system itself. Any of the sensors described herein are configured to produce a signal that is received by the controller and processed in order to carry out any of the functions described herein. The signals received by the processor may be converted to other formats for processing or storage by the processor.

The number and type of sensors provided in the control system is chosen according to the required functionality of the controller. In some embodiments, any one or more of the sensors shown in FIG. 2 may be absent if they are not required for certain functionality, e.g. if they are not required for any functions of the controller described or claimed herein.

The controller is configured to control the mixer valve 118 according to one or more target output water properties. By water properties we mean properties of water including its temperature, flow rate or pressure. The target output water properties are set by the user via the user interface 104 or via the portable remove device 116 using a suitable application running on that device, or may be defined by a shower program stored in the memory 142 of the controller. The controller is arranged to control the mixer valve in response to measurements from the output stream sensors so as to vary the flow of water through the mixer valve (e.g. through each flow control device with the mixer valve) to reach or maintain the desired target output water properties.

Figure 3:
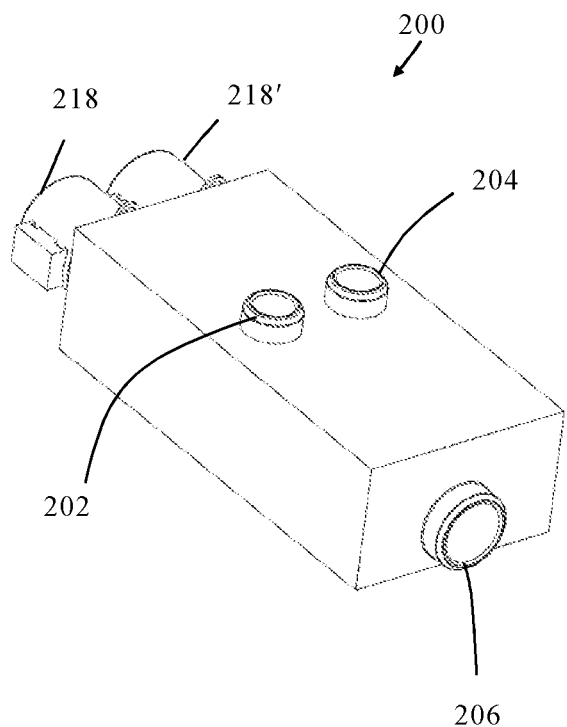
FIGS. 3 and 4 show a perspective and a side view of a mixer valve forming part of the mixer valve unit of FIG. 2.
Figure 4:
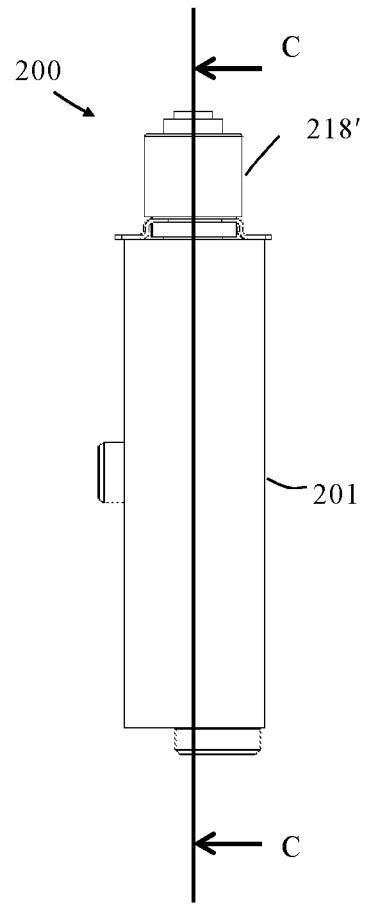
Figure 5:
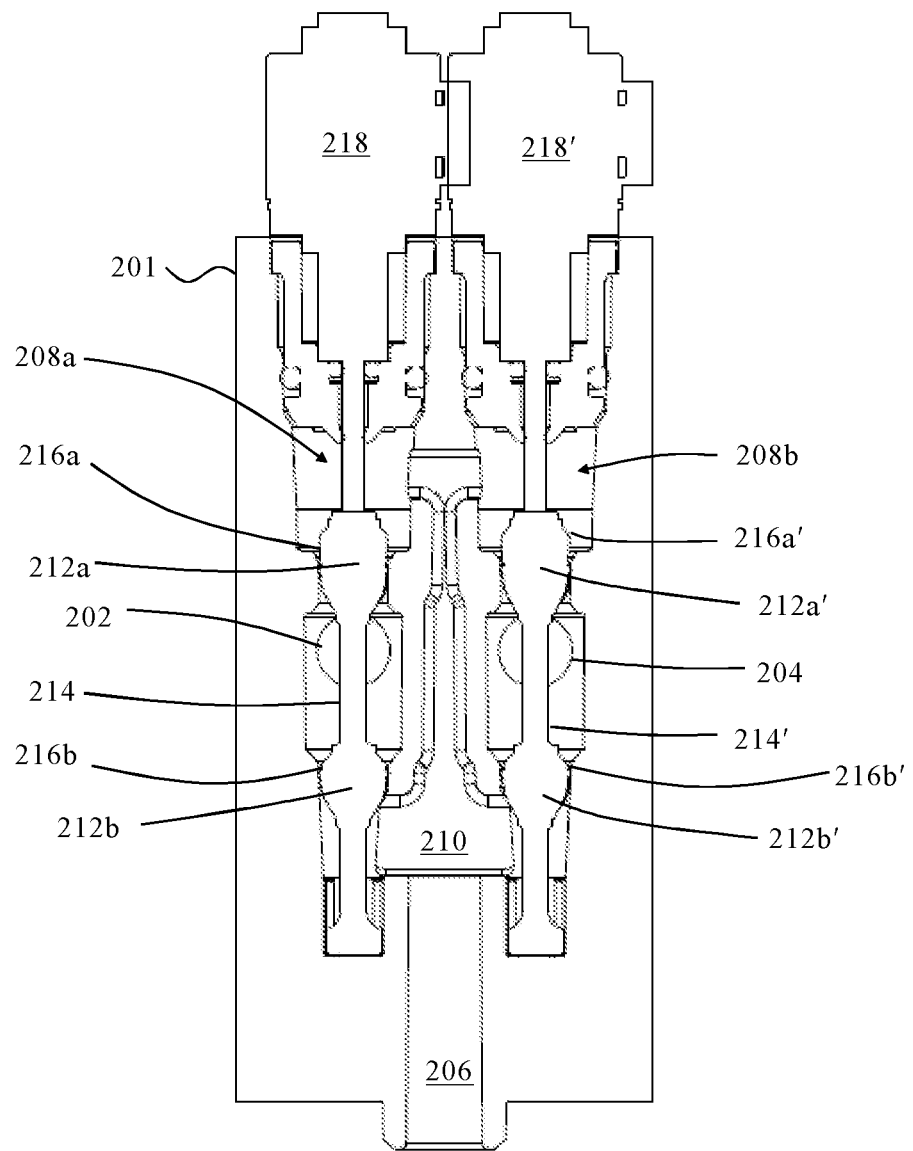
FIG. 5 shows a cross section through line CC marked in FIG. 4.

Referring now to FIGS. 3 to 5, an example of a mixer valve 200 suitable for use in the mixer valve unit 102 is shown in more detail. This is to be understood as only one example with alternative mixing valves that provide the desired controlled blending of hot and cold flows being apparent to the skilled person. The mixer valve 200 comprises a housing 201 having an aperture 202 forming a first water inlet and an aperture 204 forming a second water inlet. The housing 201 further comprises an aperture 206 to form an outlet.

The housing 201 houses a first flow control valve 208a and a second flow control valve 208b. The first flow control valve 206 is arranged to control the flow of water from the first inlet 202 to a mixing chamber 210. The second flow control valve 208 is arranged to control the flow of water from the second inlet 204 to the mixing chamber 210. From the mixing chamber 210 water flows to the outlet 206. The first and second flow control valves may control the flow of hot or cold water, depending on which if the first and second water inlets 134, 136 is connected to the hot or cold water supply.

As can be seen illustrated in FIG. 5, the first flow control valve 208a comprises a first valve member 212a and a second valve member 212b each mounted to a shaft 214. The valve members are arranged to seal against associated valve seats 216a, 216b. The shaft 214 is movable via an actuator 218. The second flow control valve 208b correspondingly comprises a first valve member 212a' and second valve member 212b' with associated valve seats 216a', 216b'. The valves members of the second flow control valve are mounted to a shaft 214' moved by an actuator 218'. The valve member controlling the flow of hot water is referred to herein as a hot valve member, and the valve member controlling the flow of cold water is referred to as a cold valve member. In some embodiments, only one valve member is provided for each of the first and second flow control valves. These may be referred to as first and second valve members elsewhere herein.

The actuators 218, 218' are adapted to control the linear position of the shafts 214, 214' and thus the position of the first and second valve members with respect to the valve seats. The actuators 218, 218' may each comprise a stepper motor coupled with a lead screw arranged to move the associated shaft 214, 214' linearly in an axial direction. Any suitable actuator for controlling linear motion of the shaft may be employed in place of the stepper motor including, but not limited to, linear actuators. The controller 120 is in communication with the actuators 118, 118' (e.g. via a wired connection) so that the flow of water through the valve can be controlled as described above. The controller may also be in communication with the valve member position sensor where provided.

The mixer valve shown in FIGS. 3, 4 and 5 is only one such example. It may, for example, be a mixer valve as described in International Patent Application No. PCT/IB2013/001646 (WO2013/190381) or PCT/GB2018/053122 (WO2019/092401), which are hereby incorporated by reference. In other embodiments, the mixer valve may comprise any suitable number of cooperating valve members and valve seats in order to control the flow of hot and cold water into a mixing chamber.

In any of the embodiments described herein the sensors provided in the mixer valve unit may instead be located remotely from the mixer valve unit whilst still being in communication with the controller 120. For example, the first and second temperature sensors could be provided further upstream, for example in the water supply conduits 108, 110 rather than being part of the mixer valve unit itself. Similarly the outlet temperature sensor could be located downstream of the mixer valve unit.

In some embodiments, the a user interface 104, and a remote on/off control 106 shown in FIG. 1 may not be provided as part of the control system 100 described or claimed herein. In such embodiments, user interaction may be provided only with the mobile device 116 or other form of wired or wireless interface. The control system described or claimed herein may therefore be the mixer valve unit 102 (including any internal or connected remotely located sensors).

Hot and Cold Inlet Designation Detection:

As discussed above, the first and second inlets 134, 136 are configured so that they can be coupled interchangeably with the hot and cold water supplies from the hot and cold conduits 108, 110. For example, the first inlet 134 can be coupled to the hot conduit 110, with the second inlet coupled to the cold conduit 108, or vice versa.

The controller 120 is configured to obtain a supply coupling setting which indicates which of the first and second inlets is to receive or is receiving hot water during operation of the control system and which of the first and second inlets is to receive or is receiving cold water during operation of the control system. This allows the mixer valve unit to be flexibly connected with either inlet receiving hot or cold water. The controller is configured to obtain a setting which reflects how the control system is connected, and control the mixer valve accordingly so that the desired blend of hot and cold water can be achieved. The controller 120 may make use of temperature signals that are generated by sensors provided to perform other functions e.g. the generation of various diagnostic signals based on the temperature values of water being supplied to the mixer valve. This advantageously allows the sensors to be used for more than one purpose.

The controller 120 is configured to obtain the supply coupling setting by determining which of the first and second inlets 134, 136 are receiving hot or cold water using the first and second temperature sensors 154*a*, 154*b*. The controller 120 is configured to compare the temperature signals provided by the first and second temperature sensors to a threshold or thresholds to determine if they are detecting a hot water supply or a cold water supply. This allows the controller 120 to automatically determine how the inlets are connected and operate accordingly without any user input.

For example, if one of the temperature sensors 154*a*, 154*b* measures a temperature signal that is consistently greater than 45 degrees it is considered by the controller to correspond to a hot water supply. If one of the temperature sensors 154*a*, 154*b* measures a temperature signal that is consistently below 15 degrees it is considered by the controller to correspond to a cold water supply. Other temperature values may be used. In other embodiments, a single threshold may be used. In that case, the controller may determine which temperature signal is above the threshold and which is below during normal operation. In some embodiments, only one of the first and second temperature sensors may be provided, and the corresponding temperature signal compared to a suitable temperature threshold or thresholds. Once one of the water supplies is determined to be hot or cold the other water supply can be inferred to be the other supply.

The controller 120 may determine whether the temperature signals are greater than or below the respective threshold consistently e.g. over a predetermined about of time such as a few seconds or minutes. This helps avoid false indications that may otherwise be the result of very short bursts of higher or lower temperature that can occur as pipework heats up or cools down when the device is not in use.

The comparison may be performed during a period of normal operation in which hot water is being supplied (rather than, for example, when the system is first turned on and an instantaneous water heater supplying the hot water is not yet at operating temperature).

The controller 120 may additionally or alternatively be configured to obtain the supply coupling setting by user input. In such an embodiment, the control system comprises a switch in communication with the controller via which the user may set the supply coupling setting. The switch may be located within the housing of the mixer valve unit, for example located on the PCBA of the controller. In other embodiments the switch may have any other suitable location, e.g. within or on the outside of the mixer valve unit.

The controller may additionally or alternatively to configured to obtain the supply coupling setting via user input received at the user interface 104 or at the portable user device 116 (e.g. via a suitable application running on the device).

The controller 120 may therefore be configured to receive the supply coupling setting from the user interface 104. The user interface 104 may be used to select the supply coupling setting during installation, as well as being used to control the ablutionary devices as described above.

The controller may be configured to receive the supply coupling setting from the remotely connected user device 116. As discussed above, this may be a smart phone or tablet device connected to the controller to allow the user to input the desired setting. The user device 116 is configured to run a suitable software application via which the user may select the supply coupling setting.

The controller 120 maybe configured to receive the supply coupling setting via a wireless network connection (e.g. Bluetooth or Wi-Fi). This may be done using the wireless communication module described above. This may be the case for where the coupling setting is received from a smart phone/table device or the like. The controller 120 may also be configured to receive the coupling setting via a wired connection to another remote device (e.g. the user interface 104 where that uses a wired connection).

Figure 6:
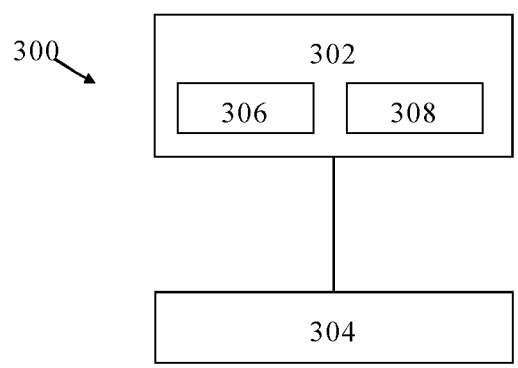
FIG. 6 shows a method of operating a control system according to another embodiment.

Referring to FIG. 6, a method 300 of operating a control system for one or more ablutionary devices is shown. The control system may be that illustrated in FIGS. 1 to 5 used to control the shower system and over-bath spout illustrated in FIG. 1. As discussed above, the control system has a mixer valve having a first inlet and a second inlet configured to receive a supply of hot and cold water, and an outlet configured to output cold water, hot water or a mixture thereof as an output stream for suppling water to the ablutionary devices downstream of the mixer valve.

The method 300 comprises obtaining 302 a supply coupling setting. The supply coupling setting indicates which of the first and second inlets is to receive, or is receiving, hot water during operation of the control system and which of the first and second inlets is to receive, or is receiving, cold water during operation of the control system. Based on the supply coupling setting the method 300 further comprises controlling 304 the mixer valve according to one or more target output water properties and the supply coupling setting. The mixer valve is controlled by using the supply coupling setting to indicate which of the valve members of the mixer valve is coupled to the hot or cold water supply and adjusting their position to obtain the desired blend of hot and cold water.

The supply coupling setting can be obtained in a number of different ways as described above. The method 300 further comprises obtaining the supply coupling setting by receiving 306 a user input defining which of the first and second inlets is coupled to a hot or cold water supply. The user input may be received from a suitable switch or the like or via a user interface. As discussed above, the user input may be received from the user interface 104 or the remote device 116. The remove device may be a smartphone/tablet configured to run a suitable application via which a user selection is made. In some embodiments, the user input is received via a wireless network connection (e.g. in the case of a smart phone/table computer) or via a wired connection.

The obtaining of the supply coupling setting further comprises obtaining 908 the supply coupling setting based on temperature signals from the first and/or second temperature sensors to indicate which of the first and second inlet are carrying a supply of hot or cold water as described above. This allows the method 300 to automatically determine how the mixer valve is connected without any input from the user. In the embodiment shown in FIG. 6, the supply coupling setting is obtained from both user input and automatically based on temperature measurements. In other embodiments, the supply coupling setting may be obtained from only one of these sources.

Various modifications will be apparent to the skilled person without departing form the scope of the claims. The embodiments described above should be understood as exemplary only. Any feature of any of the aspects or embodiments of the disclosure may be employed separately or in combination with any other feature of the same or different aspect or embodiment of the disclosure and the disclosure includes any feature or combination of features disclosed herein.

What is claimed is:

1. A control system for one or more ablutionary devices, comprising:
   a mixer valve having a first inlet and a second inlet configured to receive a supply of hot and cold water, and an outlet configured to output cold water, hot water or a mixture thereof as an output stream for supplying water to the one or more ablutionary devices downstream of the mixer valve; and
   a controller in communication with the mixer valve, the controller configured to:
      obtain a supply coupling setting that indicates which of the first and second inlets is to receive, or is receiving, hot water during operation of the control system and which of the first and second inlets is to receive, or is receiving, cold water during operation of the control system; and
      control the mixer valve of one or more target output water properties and the supply coupling setting.

2. The control system of claim 1, further comprising:
   a first temperature sensor configured to generate a first temperature signal indicative of the temperature of water being received by the first inlet; and/or
   a second temperature sensor configured to generate a second temperature signal indicative of the temperature of water being received by the second inlet,
   wherein the controller is configured obtain the supply coupling setting based on the first and/or second temperature signals.

3. The control system of claim 2, wherein the controller is configured to compare the temperature signals provided by the first and/or second temperature sensors to at least one threshold to determine if they are detecting a hot water supply or a cold water supply.

4. The control system of claim 1, wherein the controller is configured to obtain the supply coupling setting by receiving a user input defining which of the first and second inlets is coupled to a hot or cold water supply.

5. The control system of claim 4, wherein the controller is in communication with a user interface, wherein the user interface is configured to receive an input of the supply coupling setting.

6. The control system of claim 4, wherein the controller is configured to receive the supply coupling setting from a remote user device.

7. The control system of claim 6, wherein the controller is in communication with a user interface, wherein the user interface is configured to receive an input of the supply coupling setting.

8. The control system of claim 4, wherein the controller is configured to receive the supply coupling setting via a wireless connection.

9. The control system of claim 4, wherein the control system further comprises a switch, the switch being in communication with the controller and configured to receive an input of the supply coupling setting.

10. A method performed by a control system for one or more ablutionary devices, the control system comprising: a mixer valve having a first inlet and a second inlet configured to receive a supply of hot and cold water, and an outlet configured to output cold water, hot water or a mixture thereof as an output stream for supplying water to the one or more ablutionary devices downstream of the mixer valve, and a controller in communication with the mixer valve, the method comprising: obtaining a supply coupling setting that indicates which of the first and second inlets is to receive, or is receiving, hot water during operation of the control system and which of the first and second inlets is to receive, or is receiving, cold water during operation of the control system; and controlling the mixer valve of one or more target output water properties and the supply coupling setting.

11. The method of claim 10, wherein the method further comprises:
   generating a first temperature signal indicative of the temperature of water being received by the first inlet; and/or
   generating a second temperature sensor configured to generate a second temperature signal indicative of the temperature of water being received by the second inlet;
   wherein the supply coupling setting is obtained based on the first and/or second temperature signals.

12. The method of claim 11, further comprising comparing the temperature signals provided by the first and/or second temperature sensors to a at least one threshold to determine if they are detecting a hot water supply or a cold water supply.

13. The method of claim 10, wherein the method comprises obtaining the supply coupling setting by receiving a user input defining which of the first and second inlets is coupled to a hot or cold water supply.

14. The method of claim 13, wherein the input is received via a wireless network connection.

15. The method of claim 13, wherein the method comprises receiving the supply coupling setting via a user interface or remotely connected user device.

16. The method of claim 15, wherein the input is received via a wireless network connection.

17. The method of claim 13, wherein the method comprises receiving an input of the supply coupling setting via a switch of the control system.

* * * * *